United States Patent [19]
Moravchik

[11] 4,026,613
[45] May 31, 1977

[54] THRUST BEARING

[75] Inventor: Joseph L. Moravchik, Brookfield, Wis.

[73] Assignee: Orion Corporation, Grafton, Wis.

[22] Filed: Mar. 10, 1976

[21] Appl. No.: 665,487

[52] U.S. Cl. .............................................. 308/160
[51] Int. Cl.² ........................................ F16C 17/06
[58] Field of Search ................................... 308/160

[56] References Cited
UNITED STATES PATENTS

| 1,400,168 | 12/1921 | Kingsbury | 308/160 |
| 3,702,719 | 11/1972 | Hoffman | 308/160 |
| 3,893,737 | 7/1925 | Tyson | 308/160 |
| 3,912,344 | 10/1975 | McCafferty | 308/160 |

Primary Examiner—Joseph F. Peters, Jr.
Assistant Examiner—Gene A. Church
Attorney, Agent, or Firm—Quarles & Brady

[57] ABSTRACT

A self-equalizing thrust bearing has shoes mounted atop axially movable support pins, and equalizing pins rotatable about radial axes are interposed between and engage the support pins to provide for self-equalizing and to hold the support pins in the retaining ring. The equalizing pins are provided with oil passages for improved lubrication; and there are retainer clips to hold the shoes on the support pins but which do not affect operational movement of the shoes.

6 Claims, 8 Drawing Figures

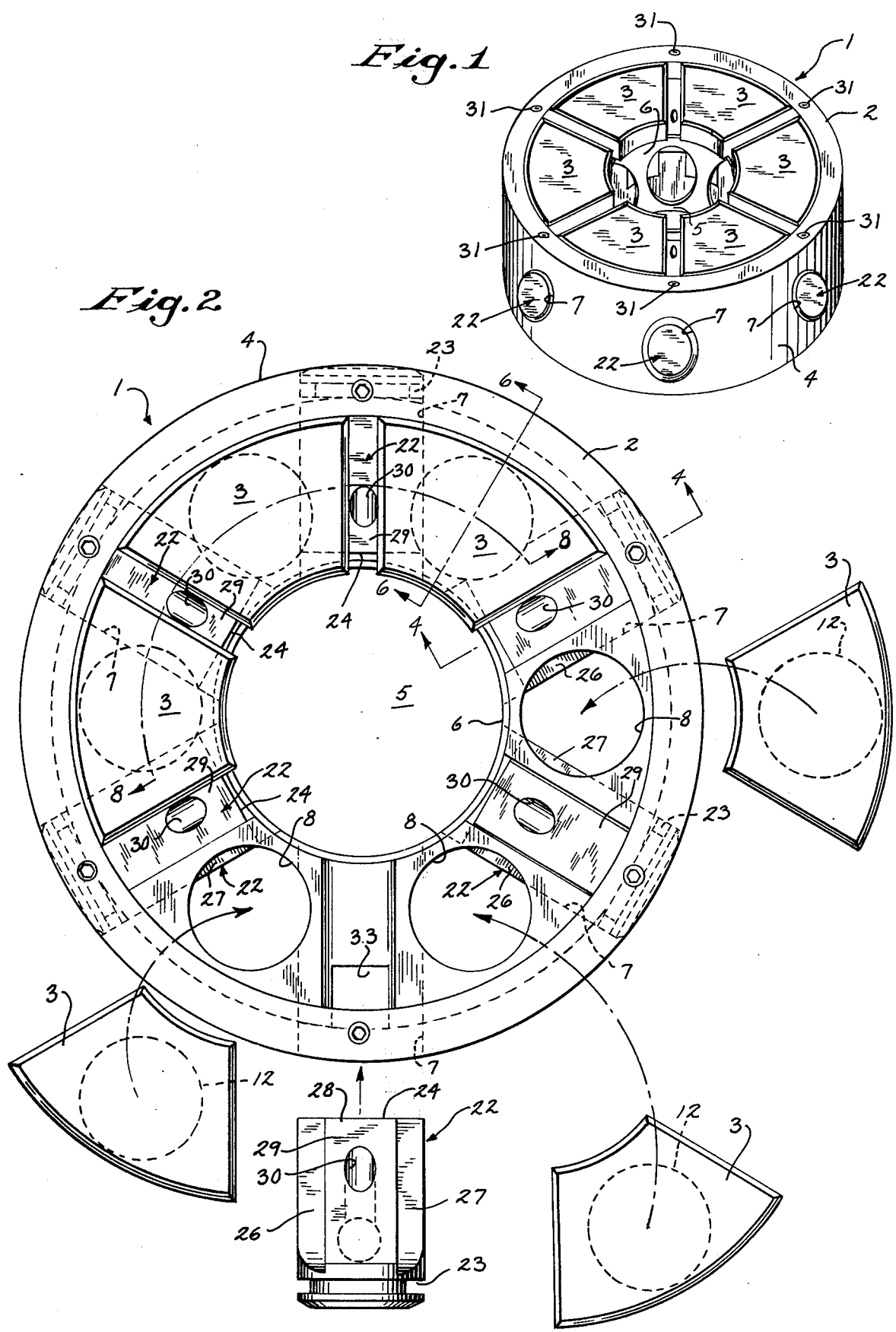

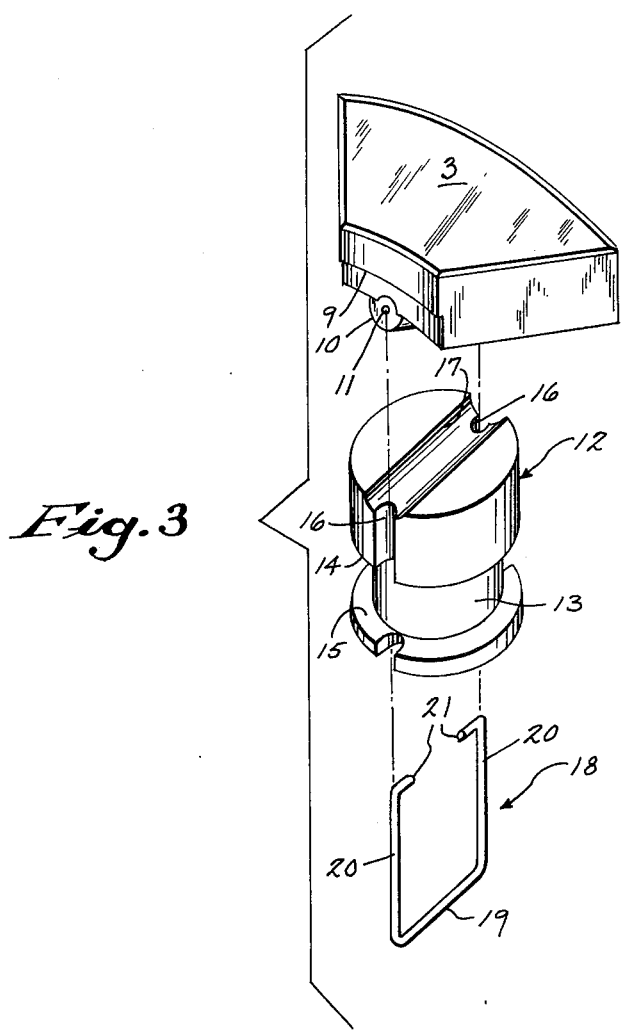
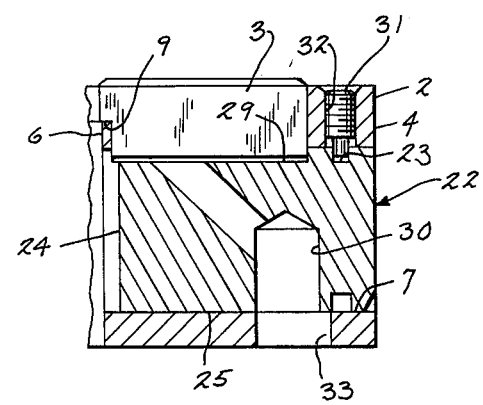
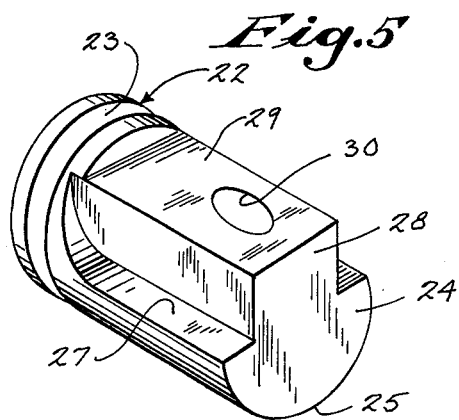
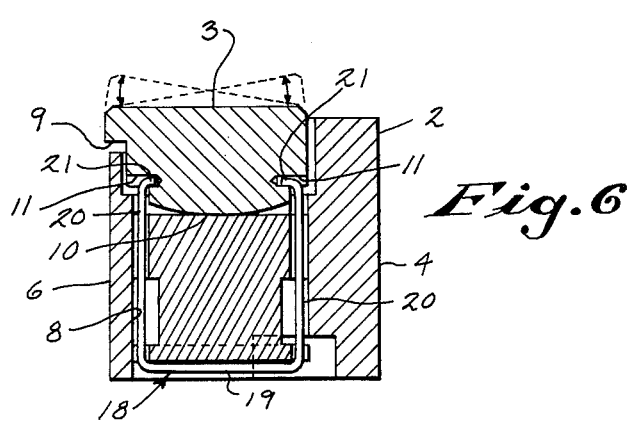

THRUST BEARING

BACKGROUND OF THE INVENTION

Self-equalizing thrust bearings are well known and are widely used in various applications, such as marine propulsion shafts, to take axial thrust from a rotating shaft.

Perhaps the best known bearing of this type is the so-called Kingsbury bearing, shown, for example, in U.S. Pat. No. 1,428,640, comprising a retaining ring and a circumferential array of thrust shoes. The shoes are atop tiltable, T-shaped equalizing links and some provision is made to allow limited relative motion so that the shoes are self-aligning to compensate for normal misalignments. Interposed between the links are inverted T-shaped links which are also tiltable and which in effect transfer axial movement of any shoe as the result of higher axial thrust; such movement will cause the underlying equalizing links to move or tilt, and engage the links on one or both sides, and these links will engage and impart opposite axial movement to the adjacent equalizing link or links and associated shoes until the thrust on the shoes has been equalized. Known bearings of this type are generally satisfactory, but there are certain problems. For one thing, in usual bearings there is excessive random movement and sliding engagement resulting in some inefficiency and excessive wear. It is also difficult to provide for adequate lubrication, and the assembly and the replacement of parts can be difficult.

SUMMARY OF THE INVENTION

The present invention contemplates a self-equalizing thrust bearing of the type including a retainer ring, a plurality of thrust shoes arranged circumferentially around the ring, and equalizing means operatively between the ring and shoes.

In the thrust bearing of the present invention the equalizing means comprises an axially movable support pin for each of the thrust shoes, each shoe being disposed atop a respective support pin which is positioned in an axial bore in the ring, the support pins being provided with ledges on their opposite circumferential sides; and an equal number of equalizing pins that are disposed in radial bores in the ring, which intersect the axial bores of respective pairs of support pins, and that are rotatable about radial axes, the equalizing pins having shoulders on their opposite circumferential sides that are engageable with the ledges of the support pins so that movement of any shoe toward the ring will cause the support pins to move axially and the adjacent equalizing pins to rotate and move the adjacent support pins and their respective shoes away from the retainer ring.

When an axially directed force is exerted on any one of the shoes the support pins and equalizing pins move only in a predetermined and controlled manner. The support pins move axially in their bores in the base ring and the equalizing pins rotate in their bores to equalize the force of the thrust over the total combined area of the shoes as an endless chain.

The equalizing pins may be provided with lubrication passages which allow a fresh supply of lubricant under pressure to be directed to the leading edge of each shoe without exposing the lubricant to the churning, turbulence and heat generating forces of the thrust collar and shaft.

In the preferred embodiment, the components of the thrust bearing are retained within the base ring without using any exposed fasteners. The thrust shoes are held against axial movement and in contact with the support pins by retaining clips which are held against deformation by the bore in which the support pin is positioned; the support pins are retained in their respective bores by the equalizing pins and the equalizing pins are retained in their respective bores by threaded retaining screws. Neither the retaining clips nor the threaded screws are subjected to any forces of the rotating thrust in operation which might cause them to be deformed.

The invention provides a thrust bearing structure in which the components move in predetermined and controlled manner, lubrication is provided in a superior manner, and the components are retained in the base ring without the use of exposed fasteners. Other objects and advantages will appear from the description to follow.

BRIEF DESCRIPTION OF THE DRAWINGS

FIG. 1 is a view in perspective showing a preferred embodiment of the invention, the thrust bearing being shown completely assembled;

FIG. 2 is an enlarged top view, partially broken away, of the thrust bearing of FIG. 1, but showing various components of the bearing removed therefrom;

FIG. 3 is an enlarged, exploded view showing the shoe, the support pin and the retaining clip;

FIG. 4 is an enlarged view in cross section through the plane 4—4 shown in FIG. 2;

FIG. 5 is an enlarged view in perspective showing a preferred embodiment of the equalizing pin;

FIG. 6 is an enlarged view in cross section through the plane 6—6 shown in FIG. 2;

DESCRIPTION OF THE PREFERRED EMBODIMENT

Figure 7:
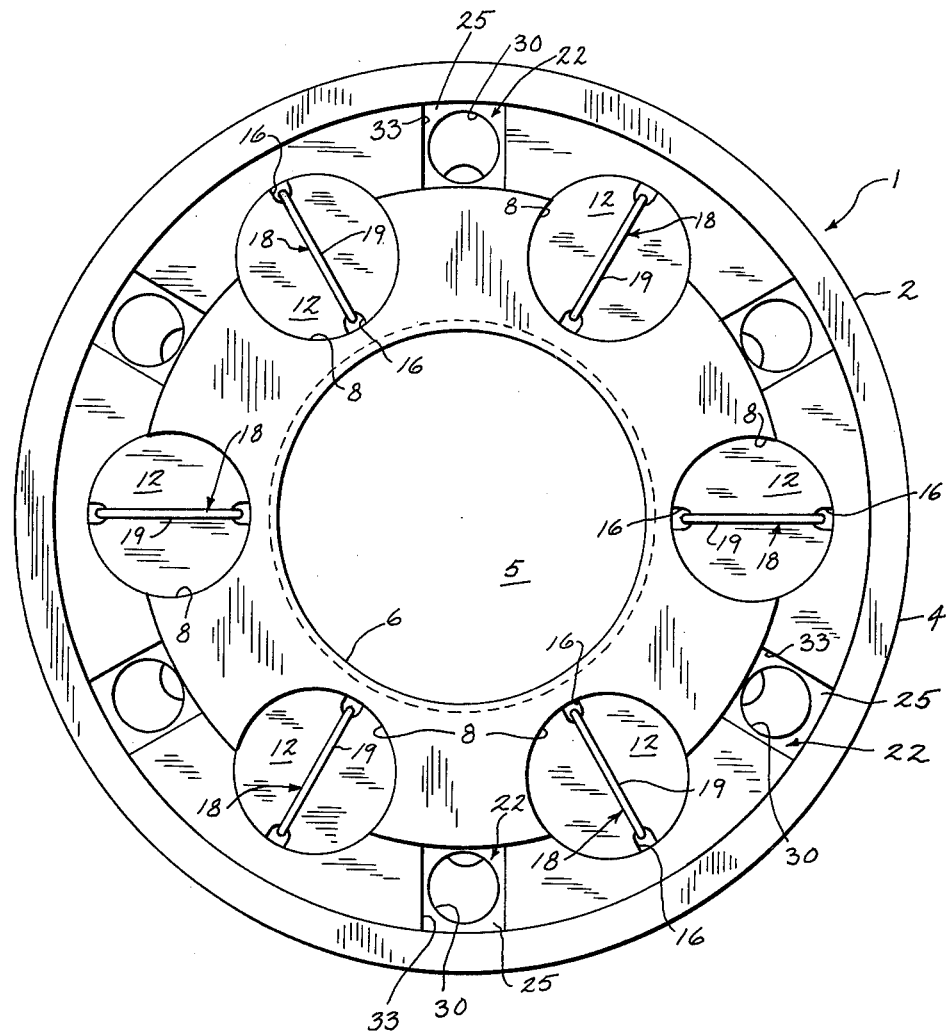
FIG. 7 is a bottom view of the thrust bearing of FIG. 1.

The thrust bearing shown in the drawings is designated generally by the reference numeral 1. It is of conventional overall configuration, including a retaining ring 2 and six thrust shoes 3 arranged circumferentially around the ring 2. The bearing is preferably made of a suitable metallic material such as steel, although it may be made of other materials suitable for bearings if so desired.

The retainer ring 2 as shown is cut from a single piece of material. While this construction is preferred, other forms could be used such as a split ring. Referring to FIG. 1, there is an outside wall 4, a central aperture 5 and an inside wall 6 circumscribing the central aperture 5. The inside wall 6 is of lesser height than the outside wall 4 and both walls are interrupted by apertures which will be described later. The thrust shoes 3 are arranged within the ring 2 and are so positioned so that they are within the outside wall 4 and overlie the inside wall 6.

Referring now to FIG. 2, it can be seen that the main body and walls 4 and 6 of the ring 2 are interrupted by not only six radial bores 7, but also by six axially extending bores 8 which are equally circumferentially spaced. The radial bores 7 are also equally spaced and each intersects two of the axially extending bores 8 at right angles. The significance of this relationship will be described later in connection with the description of the assembly and operation of the thrust bearing.

Turning now to FIG. 3, it can be seen that each of the thrust shoes 3 is of a generally conventional wedge shape with bevelled edges. However as seen in FIGS. 3 and 4, the undersurface of the inner end of the shoe 3 is provided with a step at 9 which permits the shoe to overlie the inside wall 6 as seen in FIGS. 1 and 4.

The underside of each of the shoes 3 is also provided with an integral radially extending semicylindrical boss 10 which is provided at each end with a small axially extending opening 11. As seen only in FIG. 6, the boss 10 is convexly arcuated along its length to permit motion as shown in broken lines.

Referring again to FIG. 3, it can be seen that the support pins 12 are provided to receive and support the thrust shoes 3. The support pin 12 is generally cylindrical in shape and has an area intermediate its length of reduced diameter 13. The area of reduced diameter defines an upper ledge 14 and a lower ledge 15 which are perpendicular to the axis of the support pin 12. The outer wall of the main body of the support pin 12 is interrupted by a pair of diametrically opposed vertically extending grooves 16, 16; and the top surface of the support pin is provided with a diametrically extending semicylindrical recess 17 which intersects the grooves 16 and is sized to receive the boss 10 of the thrust shoe 3.

The shoes 3 and the support pins 12 are united to form a subassembly by the retaining clips 18 which are generally U-shaped members that have a horizontal bottom section 19, vertically extending arms 20, 20 and inwardly projecting ends 21, 21 which are adapted to engage the openings 11, 11 at the opposite ends of the boss 10 of the shoe 3. The retaining clip 18 is formed of a resilient material such as spring wire which allows the arms 20, 20 to be spread apart and ends 21, 21 to be introduced into the openings 11, 11 and which upon release of the spreading force resumes its inverted U-shape.

When the shoe 3, the support pin 12 and retaining clip 18 are positioned as shown in FIG. 3, the subassembly may be formed by placing the shoe 3 upon the top surface of the support pin 12 so that the arcuate semicylindrical boss 10 is positioned in the nonarcuated semicylindrical recess 17 at the top of the support pin 12; spreading the arms 20, 20 of the retaining clip 18, introducing the ends 21, 21 of the clips into the openings 11, 11 at the opposite ends of the boss 10 and then allowing the clip to resume its inverted U-shape. When thus assembled, each of the arms 20, 20 of the clip will be in one of the vertically extending grooves 16 and the retaining clip 18 will limit the axial movement of shoe 3 relative to the support pin 12.

The thus formed subassembly may then be placed in its axial bore 8 as indicated in FIG. 2 and shown in cross section in FIG. 6. As seen in FIG. 6, at this stage of the assembly, the extent of the downward axial movement of the subassembly in the bore 8 is limited by the step 9 of the shoe 3 which contacts the top of the inside wall 6 and the undersurface of the shoe which contacts the upper surface of the ring entrapped between the inside wall 6 and the outside wall 4.

The components of the subassembly just described are all sized so that the unit is free to move vertically in the axial bore 8 with a minimum of sidewise wobble or motion and so that the bore 8 effectively prevents the arms 20 of the retaining clip 18 from being spread or deformed in operation.

The unique equalizing pins of the thrust bearing are seen in FIGS. 2, 4 and 5. As seen in FIG. 5, the equalizing pin 22 is a generally cylindrical shaped body which is round at one end and provided adjacent that end with an annular groove 23. The remainder of the cylindrical body is cut away to form an intermediate and other end portion 24 having a rounded semicylindrical bottom 25, opposed shoulders 26 and 27, and a stem 28. The shoulders 26 and 27 are perpendicular to side walls of the stem 28 and the top of the stem 29 is parallel to the shoulders 26 and 27. Therefore, in cross section that portion of the equalizing pin resembles an inverted rounded "T".

The equalizing pin may also be further provided with a passage 30 therethrough for the delivery of lubricant. As best seen in FIG. 4, the entrance of the passage 30 is in the bottom of the pin where it can communicate with a lubrication passage 33 in the retaining ring and the exit of the passage is at the top 30 of the stem 29.

When positioned in their respective radial bores 7 as shown in FIG. 2, the equalizing pins 22 are retained within the radial bores 7 by small threaded screws 31 seen best in FIG. 4. The screws are adapted to enter threaded apertures 32 which intersect the radially extending bores 7 in the retaining ring 2. The screws 31 are of sufficient length so that when they are threaded down below the top of the retaining ring 2, as seen in FIG. 4, the free end of the screw extends below the threaded aperture 32 and only partially enters the annular groove 23 of the equalizing pin 22 thus preventing the equalizing pin 22 from being removed from its bore 7 and the ring 2 but not interfering with the rotation of the equalizing pin 22 within the bore 7.

Figure 8:
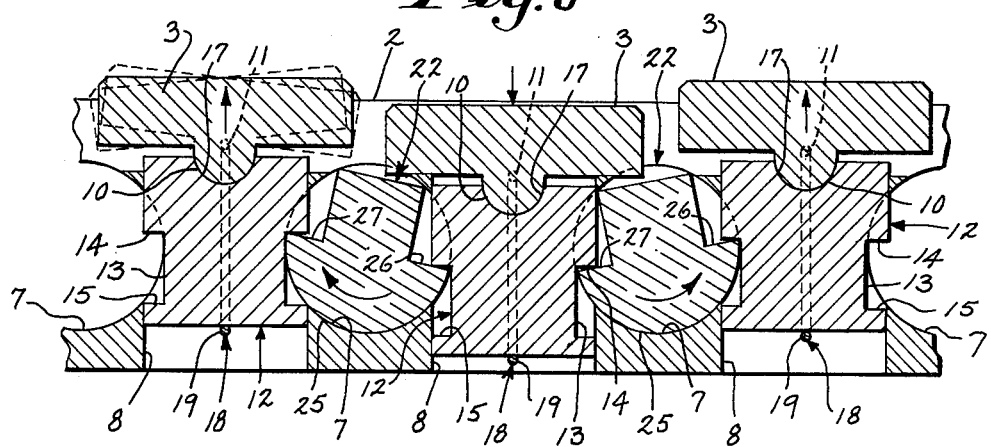
FIG. 8 is an enlarged view in cross section through the plane 8—8 shown in FIG. 2, but in which an axial force has been exerted on the middle shoe to illustrate the self-equalizing feature.

The thrust bearing is preferably assembled by first forming subassemblies of the thrust shoes 3, support pins 12, and retaining clips 18; then placing the subassemblies in the axial bores 8 in the ring as indicated in FIGS. 2, and 6. Next, two of the subassemblies positioned in adjacent axial bores 8 intersected by a common radial bore 7 are raised sufficiently in the bores 8 so that an equalizing pin 22 can be inserted in the intersecting radial bore 7 in such a manner that the shoulders 26 and 27 of the equalizing pin 22 each engage the upper ledge 14 of the two adjacent support pins 12 as seen in FIG. 8. Finally, a small threaded screw 31 is threaded down in the appropriate aperture 32 so that the end of the screw 31 extends partially into the groove 23 of the equalizing pin 22 in such a manner that the equalizing pin 22 is free to rotate in its bore 7 but cannot be removed therefrom. The procedure is then repeated until all the subassemblies and equalizing pins are in place as seen in FIG. 1. When completely assembled the bottom view of the thrust bearing is as seen in FIG. 7.

Obviously, the bearing can be completely disassembled by reversing the assembly process. However, if it were desired to only partially disassemble the bearing, for example, to replace a single worn shoe 3, it would only be necessary to retract the threaded screws 31 which retain the equalizing pins 22, on each side of the shoe 3 to be replaced, remove both of the equalizing pins 22, remove the subassembly consisting of the thrust shoe 3, the support pin 12 and the retainer clip 18, spread the arms 20, 20 of the clip and remove the ends 21, 21 from the openings 11, 11 in the boss 10 of the old shoe and insert them into similar openings in a new shoe. Obviously, the remaining shoes need not be disturbed.

In the construction just described, of course, it is intended that all the like elements conform to each other in size, strength and other structural characteristics as nearly as practical. The components may be of any material appropriate for the application.

Once assembled and in operating position the described thrust bearing effectively spreads an unequal axial load exerted upon any one shoe of the bearing over the two adjoining shoes. Referring to FIG. 8, it can be seen that as a greater axial force of the rotating thrust collar (not shown) is exerted on the bearing surface of the middle shoe 3, the shoe is caused to be forced downward and the axial force is transferred by the semicircular boss 10 of the shoe to the semicylindrical recess 17 in the support pin 12 which causes the pin to slide axially downward in its bore 8 until the ledges 14 of the support pin 12 contact the shoulders 26, 26 of the adjoining equalizing pins 32. As the force continues the rounded bottoms 25 of the equalizing pins 22 are caused to rotate within their respective radial bores 7. A that time the other shoulders 27, 27 of the same adjoining equalizer pins 22 contact the ledges 14 of the adjoining support pins 12 causing both of those pins to move upwardly in their bores 8 thereby causing the support pins 12 and the shoes 3 to raise and the bearing surfaces of the shoes to accept and to equalize the force of the thrust over the total combined areas of the two adjacent thrust shoes. The described action occurs before the downward axial force can cause the step 9 in the bottom of the shoe to contact the top of the inside wall 6. The described self-equalizing feature takes effect as soon as any unequal downward axial thrust load is placed upon any shoe of the bearing and continues automatically whenever during operation the downward axial thrust loads are not distributed evenly among the shoes.

From the foregoing description it is apparent that the thrust bearing of the present invention provides a constuction in which predetermined, controlled axial and rotational movement replaces the random sliding and tilting motion of the prior art bearings which can result in abnormal bearing wear.

It will also be apparent to those skilled in the art that the described thrust bearing is also self-aligning.

The self-aligning feature of the bearing is attained by arcuating the length of the semicircular boss 10 of the thrust shoes. This is done to allow the upper bearing surface of the shoe to tilt, as seen in broken lines in FIG. 6, to maintain a parallel attitude to the radial plane of the rotating thrust collar at all times. The result is to provide adequate, yet limited alignment to better stabilize the function of the bearing by eliminating overcompensation that can subject the thrust shoes to excessive motion and wear. Still further, the coaction of the convexly arcuated boss 10 and the non-arcuated recess 17 allows the center pivot point of the shoe to change in relation to the inside and outside diameters of the shoes as it aligns with the rotating thrust collar. Thus, when any radial angularity in the rotating thrust collar transpires to cause the shoe 3 to tilt, to align and also to be forced downward and cause the aforedescribed self-equalizing feature to function it also causes the point at which the arcuated surface of the semicircular boss 10 of the shoe contacts the recess 17 to move in relation to the center pivot point of the remaining shoes in the subassembly. The result is that a greater bearing surface area of the shoe is exposed by changing the pivot point along the arcuated line with respect to the geometric configuration of the shoe segment thus enabling the shoe to better accept this force and perform the self-aligning function.

The use of such convex arcuate bosses on thrust bearings is novel although they have been used in journal bearings. (See U.S. Pat. No. 3,297,371.)

It is important to note that the retaining clip 18 and the threaded screws 32 are not subjected to any axial or radial forces of the rotating thrust which would tend to deform them while the bearing is in operation. The sole function of the retaining clip 18 is to hold the shoes 3 against unlimited axial movement and the function of the screws 31 is to maintain the thrust bearing in assembled condition.

The thrust bearing described also provides for a unique lubrication system. The lubrication of the bearing is provided through a lubrication passage 33 in the base of the ring 2, which exposes the radial bore 7, the equalizing pin 22 and the passage 30. The lubrication passage 33 is best seen in FIG. 4. The passage 30 in the equalizing pin 22 is enclosed and thus allows a fresh supply of lubricant from a lubricant reservoir (not shown) to be directed under pressure to a point between each shoe, as seen in FIG. 1, thereby enabling the lubricant to reach the leading edges of the bearing surfaces of the shoe without being exposed to the rotating and churning forces of the rotating thrust plate and its supporting shaft. Obviously, if desired, the passage 30 in the equalizing pin 22 may be eliminated or varied in size, quantity or direction without affecting the self-equalizing feature.

The preferred embodiments of the invention shown and described are highly effective, but it will be obvious that various modifications might be made without departure from the spirit of the invention. The invention may, for example, employ two or more thrust shoes; and the nonfunctional portions of the components could be differently shaped. For example, the equalizing pins could be of varied shapes as long as they were provided with a rounded bottom to permit them to slide and rotate about an axis. In view of the possible modifications, the invention is not intended to be limited by the showing or description herein, or in any other manner, except insofar as may specifically be required.

I claim:

1. A self-equalizing thrust bearing includes:
    a. a retaining ring having a plurality of axial apertures spaced equally apart and an equal plurality of radial apertures each of which intersects two adjacent axial apertures,
    b. an equal plurality of thrust shoes arranged circumferentially around the ring,
    c. an equal plurality of axially movable support pins each positioned in its own axial aperture in said ring, said support pins having a top surface which is adapted to coact with the bottom surface of a thrust shoe positioned upon it to allow said shoe to tilt and align in response to pressure upon the upper surface of said shoe and to prevent the shoe from rotating within the ring, the support pins being further provided with ledges on their opposite circumferential sides, and
    d. an equal plurality of equalizing pins each of which is positioned in its own radial aperture, said equalizing pins having shoulders that are engagable with the ledges of the support pins positioned in each of the intersected axial apertures so that when a thrust shoe moves toward the ring its support pin moves in its axial aperture to cause each of the adjacent equalizing pins which it contacts to rotate within its radial aperture to move another support pin which it contacts and a thrust shoe associated with that support pin away from the ring.

2. The bearing of claim 1 in which the support pins are retained in their respective axial apertures by an equalizing pin.

3. The bearing of claim 1 in which an equalizing pin is retained in its radial aperture by a fastener which extends through an aperture in the ring which intersects the radial aperture sufficiently to prevent the equalizing pin from being removed from the radial aperture without interfering with the rotation of the equalizing pin.

4. The bearing of claim 1 in which the underside of each thrust shoe is provided with a semicylindrical boss which is convexly arcuate along its length and the top of each support pin is provided with a boss-receiving semicylindrical recess.

5. The bearing of claim 1 in which the thrust shoe and the support pin are maintained in operable position by a removable retaining clip.

6. The bearing of claim 1 in which the equalizing pins are provided with lubrication passages for directing lubricant between the thrust shoes.

* * * * *